United States Patent [19]
Banerjee et al.

[11] Patent Number: 6,008,278
[45] Date of Patent: Dec. 28, 1999

[54] RHEOLOGY CONTROL AGENTS FOR HIGH SOLIDS THERMOSET COATINGS

[75] Inventors: Krishna G. Banerjee, Stow; Edmund J. Karp, Rocky River; Richard M. Lange, Euclid; Thomas F. Steckel, Chagrin Falls, all of Ohio

[73] Assignee: The Lubrizol Corporation, Wickliffe, Ohio

[21] Appl. No.: 08/854,218

[22] Filed: May 9, 1997

[51] Int. Cl.⁶ ........................................................ C08K 5/20
[52] U.S. Cl. ........................... 524/221; 524/186; 524/236; 524/244; 524/247
[58] Field of Search ..................................... 524/221, 186, 524/236, 244, 247

[56] References Cited

U.S. PATENT DOCUMENTS

| | | | |
|---|---|---|---|
| 3,808,167 | 4/1974 | Petersen et al. | 524/221 |
| 4,451,597 | 5/1984 | Victorius | 524/39 |
| 4,547,532 | 10/1985 | Bednarski et al. | 524/221 |
| 5,034,444 | 7/1991 | Yun et al. | 524/223 |
| 5,086,104 | 2/1992 | Wada et al. | 524/217 |
| 5,321,098 | 6/1994 | Lal | 525/425 |
| 5,369,184 | 11/1994 | Burgoyne, Jr. et al. | 525/327.6 |
| 5,374,682 | 12/1994 | Gouda et al. | 525/185 |
| 5,412,023 | 5/1995 | Hille et al. | 524/539 |
| 5,536,871 | 7/1996 | Santhanam | 560/196 |

*Primary Examiner*—Fred Zitomer
*Attorney, Agent, or Firm*—James L. Cordek; Joseph P. Fischer

[57] ABSTRACT

Disclosed is a coating composition comprising (A) a film forming resin;

(B) a rheology control agent; and (C) a pigment.

24 Claims, No Drawings

RHEOLOGY CONTROL AGENTS FOR HIGH SOLIDS THERMOSET COATINGS

FIELD OF THE INVENTION

The present invention relates to rheology control agents for non-aqueous coating compositions, especially high solids coating compositions. The present invention also relates to organic coating compositions containing the rheology control agent.

BACKGROUND OF THE INVENTION

When applying coatings that contain a high amount of solids such as industrial coatings, maintenance coatings or paints, there is a tendency for the coating to sag or run. This tendency is especially prevalent when a workpiece, which is to accept the coating, is in a vertical position. Regarding workpieces that are vertically oriented, the coating may droop or sag due to gravity so that the thickness of the film formed when the coating is ultimately dried is uneven. Some sagging may occur by influence of gravity when the coating is applied. However, such sagging is more particularly a problem when baking the applied coating. An approach to overcome the sag problem is to include a rheology control agent in the coating so that the resultant effect of gravity is lessened. Such rheology control agents basically cause the coating to be shear thinning and to have high viscosity (decreased fluidity) at low shear while providing sufficiently low viscosity at high shear to permit flow and leveling on the workpiece.

U.S. Pat. No. 4,451,597 (Victorius, May 29, 1984) relates to coating composition useful as the exterior finish on automobiles and trucks and contains about 25–50% by weight of a binder of film-forming constituents and 50–75% by weight of a volatile organic solvent carrier and additionally contains 2–150% by weight, based on the weight of the binder, of pigment; the binder is about 20–70% by weight of an acrylic polymer containing reactive hydroxyl, carboxyl, amide groups or any mixture of such groups, about 0–40% by weight of a hydroxy-terminated polyester urethane resin and about 25–40% by weight of an alkylated melamine formaldehyde crosslinking resin; in addition the composition contains about 4–20% by weight, based on the weight of the binder, of a rheology control agent of an alcohol soluble cellulose acetate butyrate having a buryryl (sic) content of about 40–50% by weight, a hydroxyl content of about 4–5% by weight and a viscosity of about 0.2–0.4 second.

U.S. Pat. No. 5,034,444 (Yun et al., Jul. 23, 1991) discloses a rheology additive for non-aqueous coating compositions. The additive may be the reaction product of an alkoxylated aliphatic nitrogen-containing compound, an aliphatic diamine or mixtures thereof, and an organic polycarboxylic anhydride or acid, an alkanediol polyepoxide ether, or mixtures thereof. The additive provides excellent anti-sag and storage stability properties, particularly for high solids coating compositions, without causing a significant increase in viscosity. Also disclosed are coating compositions containing the additive.

U.S. Pat. No. 5,086,104 (Wada et al., Feb. 4, 1992) discloses polyester resin compositions which include a crystalline thermoplastic polyester resin (such as polybutylene terephthalate), a polyester elastomer (such as a copolymer including recurring hard and soft segments) and between 0.005 to 10 parts by weight, based on 100 parts of the crystalline and elastomeric resins, of an amide compound having the formula

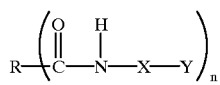

wherein R is an organic group such as an aromatic ring, X is an alkylene of $C_2$ to $C_{10}$ such as ethylene and propylene, Y is —COOH, —OH, —SH or —$NH_2$ and n is 2 to 4, inclusive.

U.S. Pat. No. 4,321,098 (Lal, Jun. 14, 1994) relates to a composition mixture comprising (i) at least one ester-acid, ester-salt or mixtures thereof and (ii) at least one amidic-acid, amidic-salt or mixtures thereof and polymer fabrics treated with the same. The treated polymer fabrics have improved wicking-wetting characteristics. The treated polymer fabrics maintain these characteristics upon repeated exposure to aqueous fluids.

U.S. Pat. No. 5,369,184 (Burgoyne, Jr. et al., Nov. 29, 1994) relates to resins which comprise polymers which contain multiple acetal groups that have been developed which are useful for crosslinking and adhesion promotion in coating and adhesive applications. The polymers which make up these resins are prepared by the addition of aminoacetals to polymers containing anhydride functionality. The polymers are modified by titration with ammonia or a primary or secondary amine which solubilizes the polymer in aqueous systems.

U.S. Pat. No. 5,374,682 (Gouda et al., Dec. 20, 1994) is directed to a thermosetting coating composition that contains (a) an acrylic resin having hydroxyl groups and epoxy groups in a molecule thereof; (b) a resin prepared from a monomer having an unsaturated group and an acid anhydride group the acid anhydride group being half-esterified, half-thioesterified and/or half-amidized; (c) at least one of hydroxyl group-containing resin selected from the group consisting of an acrylic resin containing hydroxyl groups and carboxyl groups, a fluorine-containing copolymer resin and a polyester resin; and (d) a melamine resin.

U.S. Pat. No. 5,412,023 (Hille et al., May 2, 1995) relates to aqueous dispersions of crosslinked polymer microparticles, prepared in an aqueous medium from a polymer, optionally dissolved in an organic solvent, said polymer bearing at least two hydroxyl groups and comprising a number of ionic groups sufficient for the formation of a stable aqueous dispersion, as the component (A) and one further component (B) at an elevated temperature, characterized in that component (A) is a polyesterpolyol, a polyurethane or a polyacrylate having an acid value of from 5 to 168, and that component (B) is an aminoplast resin consisting of molecules containing at least two reactive groups consisting of hydroxyl and/or amino and/or ether groups, that the ratio by weight of component (A) to component (B) is between 30:70 and 95:5, and that the dispersion is stable and usable in water and/or an organic solvent or mixtures thereof. The reference further relates to a process for producing these dispersions, the use thereof and coating compositions containing aid dispersions.

U.S. Pat. No. 5,536,871 (Santhanam, Jul. 16, 1996) is directed to a liquid, pourable rheology additive especially usefull for thickening liquid organic compositions which comprises the reaction product of a defined polyalkoxylated nitrogen-containing compound, polycarboxylic acid and a liquid diamine. The additive, which exists in a pourable, pumpable form at up to a 100% rheologically active composition, exhibits excellent thickening efficiency for systems including inks, epoxies, polyesters, paints, greases and other systems, including ease of dispersibility, without adversely affecting gloss. The additive operates by both an associative and a reaction mechanism to provide rheology viscosity properties to such systems, and is also similarly useful for aqueous systems.

SUMMARY OF THE INVENTION

A sag resistant coating composition is disclosed which comprises (A) a film forming resin;

(B) a rheology control agent; and (C) a pigment.

DETAILED DESCRIPTION OF THE INVENTION

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-substituted aliphatic substituents or aromatic-substituted alicyclic substituents, or, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkyl-thio, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. In one embodiment, the hydrocarbyl group is purely hydrocarbon.

(A) The Film Forming Resin

For purposes of the present invention, the film forming resins (A) are high solids compositions having a nonvolatile solids content of from about 60 to about 100, preferably from about 65 to about 100 and most preferably from about 75 to about 100 percent by weight and correspondingly from about 0 to about 40, preferably from about 0 to about 35 and most preferably from about 0 to about 25 percent by weight of organic solvents. Typical organic solvents include butanol, xylene, glycol ethers and esters thereof, various short chain alcohols, ketones, and aromatic, aliphatic and chlorinated hydrocarbons, as is well known in the art. Of course, where the solids content is 100% by weight a solventless system is present wherein no weight loss occurs as the coating cures.

As mentioned above, the present invention provides a rheology additive for various coating compositions. Conventional coatings as well as high solids systems typically contain from about 15 to 45 percent by weight of nonvolatile resins, such as those based on polyester-melamine, polyester-urea/formaldehyde, alkyd-melamine, alkyd-urea/formaldehyde, acrylic-melamine, acrylic-ureal formaldehyde, epoxy resins, epoxy ester-melamine, polyurethane resins, acrylic resins, oleoresins, unsaturated polyesters, polyvinyl acetates, polyvinyl chlorides or vinyl acrylics. The preferred resins comprise polyester-melamine, polyester-urea/ formaldehyde, alkyd-melamine, acrylic melamine or polyurethanes. The most preferred resins comprise polyester-melamine, acrylic-melamine or polyurethanes.

(B) The Rheology Control Agent

The rheology control agent of the present invention comprises the reaction product of (i) at least one carboxylic acylating agent, and (ii) at least one nitrogen containing compound consisting of a hydroxyamine or a hydroxyimine.

The carboxylic acylating agents (i) comprise mono-carboxylic acid acylating agents, poly-carboxylic acid acylating agents as well as dimer acids, trimer acids, or mixtures thereof. The mono-carboxylic acid acylating agents are of the formula $R^7COOH$ wherein $R^7$ is a hydrocarbyl group containing from 7 up to about 23 carbon atoms. Preferably the hydrocarbyl group is an aliphatic group comprising an alkyl group or an alkenyl group and contains from 13 up to 19 carbon atoms. Useful monocarboxylic acids are the isomeric acids of octanoic acid, nonanoic acid, decanoic acid, undecanoic acid and dodecanoic acid. Also useful are myristic acid, palmitic acid, stearic acid, oleic acid, linoleic acid and linolenic acid. Mixed acids as derived by hydrolysis of animal fats and vegetable oils also have utility.

The poly-carboxylic acid acylating agent comprises dicarboxylic acid acylating agents or dicarboxylic acid anhydride acylating agents formulae I and II respectively.

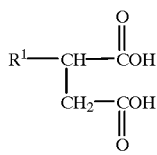

I

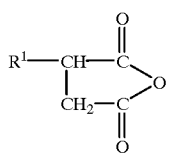

II

In the above formulae, R' is a hydrocarbyl based substituent having from 5 up to 100 carbon atoms.

The polycarboxylic acid acylating agents also include dimer acid acylating agents, trimer acid acylating agents and mixtures thereof.

The dimer acylating agents are the products resulting from the dimerization of unsaturated fatty acids. Generally, the dimer acylating agents have an average from about 18, preferably about 28 to about 44, preferably to about 40 carbon atoms. In one embodiment, the dimer acylating agents have preferably about 36 carbon atoms. The dimer acylating agents are preferably prepared from fatty acids. Fatty acids generally contain from 8, preferably about 10, more preferably about 12 to 30, preferably to about 24 carbon atoms. Examples of fatty acids include oleic, linoleic, linolenic, tall oil, and resin acids, preferably oleic acid, e.g., the above-described fatty acids. The dimer acylating agents are described in U.S. Pat. Nos. 2,472,760; 2,482,761; 2,731,481; 2,793,219; 2,964,545; 2,978,463; 3,157,681 and 3,256,304, the entire disclosures of which are incorporated herein by reference. Examples of dimer acylating agents include Empol® 1043 and 1045 Dimer Acid, each available from Emery Industries, Inc. and Hystrene Dimer Acids 3675, 3680, 3687 and 3695 available from Humko Chemical.

Trimer acid acylating agents are prepared by reacting a dimer acid acylating agent with an unsaturated fatty acid.

The poly-carboxylic acid acylating agents are well known to those skilled in the art. See, for example, the following U.S. patents which are hereby incorporated by reference for their disclosures relating to the preparation of carboxylic acid acylating agents: U.S. Pat. Nos. 3,219,666; 3,272,746; 3,381,102; 3,254,025; 3,278,550; 3,288,714; 3,271,310; 3,373,111; 3,346,354; 3,272,743; 3,374,174; 3,307,928; and 3,394,179.

Generally, the polycarboxylic acid acylating agents are prepared by reacting an olefin polymer or chlorinated analog thereof with an unsaturated carboxylic acid or derivative thereof such as acrylic acid, fumaric acid, maleic anhydride and the like. Typically, the polycarboxylic acid acylating agents are succinic acid acylating agents derived from maleic acid, its isomers, anhydride and chloro and bromo derivatives.

These acylating agents have at least one hydrocarbyl-based substituent $R^1$ of about 5 to about 100 carbon atoms. Generally, $R^1$ has an average of at least about 8, and often at least about 18 carbon atoms. Typically, $R^1$ has a maximum average of about 50 and often about 36 carbon atoms.

In general, the hydrocarbon-based substituent $R^1$ of at least 5 carbon atoms present in the polycarboxylic acid acylating agents used in this invention are free from acetylenic unsaturation; ethylenic unsaturation, when present will generally be such that there is not more than one ethylenic linkage present for every ten carbon-to-carbon bonds in the substituent. The substituents may be completely saturated or contain ethylenic unsaturation.

As noted above, the hydrocarbon-based substituent $R^1$ present in the polycarboxylic acid acylating agents of this invention are derived from olefin polymers or chlorinated analogs thereof. The olefin monomers from which the olefin polymers are derived are polymerizable olefins and monomers characterized by having one or more ethylenic unsaturated groups. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group

However, certain internal olefins can also serve as monomers (these are sometimes referred to as medial olefins). When such olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)phenyl groups) and alicyclic groups such as would be obtained from polymerizable cyclic olefins or alicyclic- substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbon based substituents in the acylating agents used in this invention are ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2, butadiene-1,3, pentadiene-1,2, pentadiene-1,3 isoprene, hexadiene-1,5,2-chloro-butadiene-1,3,2-methylheptene-1,3-cyclohexylbutene-1,3,3-dimethylpentene-1, styrenedivinylbenzene, vinylacetate, allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s. As indicated above, polyisobutenyl substituents are preferred in connection with the present invention. These polyisobutenyl polymers may be obtained by polymerization of a $C_4$ refinery stream having a butene content of about 35 to about 75 percent by weight and an isobutene content of about 25 to about 65 percent by weight in the presence of a Lewis acid catalyst such as aluminum chloride or boron trifluoride. These poly(isobutene)s contain predominantly (that is, greater than 80%) isobutene repeat units of the configuration

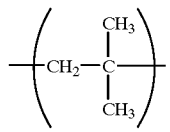

Typically, the hydrocarbyl-based substituent $R^1$ in the polycarboxylic acid acylating agent as used in the present invention is a hydrocarbyl, alkyl or alkenyl group of about 5, often about 18, to about 100, sometimes about 36, carbon atoms. For convenience herein, such substituents are represented by the indicia "hyd".

As noted above, typical polycarboxylic acid acylating agents are substituted succinic acids or derivatives thereof. In this case, the preferred polycarboxylic acid acylating agent can be represented by the formulae:

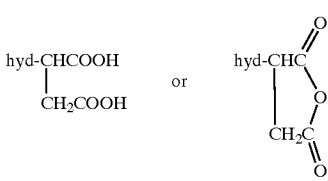

Such succinic acid acylating agents can be made by the reaction of maleic anhydride, maleic acid, or fumaric acid with the aforedescribed olefin polymer, as is shown in the patents referred to above. Generally, the reaction involves merely heating the two reactants at a temperature of about 150° C. to about 200°. Mixtures of these polymeric olefins, as well as mixtures of these unsaturated mono- and polycarboxylic acids can also be used.

The dicarboxylic acid acylating agents or dicarboxylic acid anhydride acylating agents can also be represented by the formulae

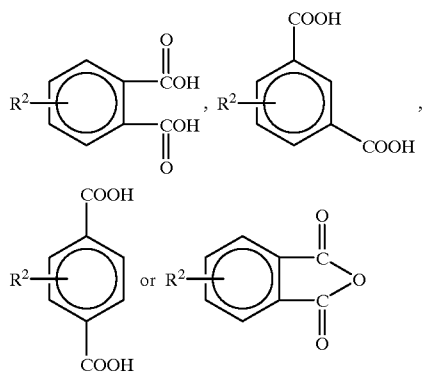

wherein $R^2$ is a hydrogen atom or an aliphatic group containing from 8 up to 36 carbon atoms.

A preferred mixture of acylating agents comprises a mixture of phthalic acid and maleic anhydride in a mole ratio of one mole of phthalic acid per three moles of maleic anhydride.

The nitrogen containing compound (ii) consists of a hydroxyamine or a hydroxyimine.

The hydroxyamines which are reacted with the carboxylic acylating agents (i) are represented by the formula

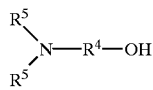

wherein $R^4$ is a divalent hydrocarbyl group containing from 2 up to 18 carbon atoms and each $R^5$ is independently hydrogen, an aliphatic group containing from 1 up to 8 carbon atoms or a hydroxy alkyl group containing from 1 up to 5 carbon atoms with the proviso that the hydroxyamines are not alkoxylated hydroxyamines. When $R^5$ is an aliphatic group, preferably the aliphatic group contains from 1 up to 6 carbon atoms and most preferably from 1 up to 4 carbon atoms. When $R^5$ is a hydroxy alkyl group, preferably the alkyl group contains from 1 up to 3 carbon atoms and most preferably from 1 to 2 carbon atoms.

Preferably the $R^4$ group is a 1,2- or 1,3-alkylene group. That is, at most there are only two or three carbon atoms between the nitrogen and the hydroxyl group. The preferred $R^4$ groups are ethylene; 1,2-propylene; 1,2-butylene; 1,3-butylene, 1,2-pentylene, 1,2-hexylene; 1,2-heptylene; 1,2-octylene; 1,2-nonylene; 1,2-decylene; 1,2-dodecylene; 1,2-hexadecylene or 1,2-octadecylene. Preferably the $R^4$ group is a 1,2-alkylene group and most preferably $R^4$ is ethylene. Further, the 1,2-alkylene group preferably generates a hydroxyamine with a primary OH rather than a secondary OH. That is, when $R^4$ is a 1,2-propylene, the substitution is such that the hydroxyamine has the structure

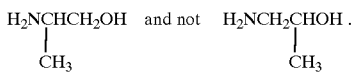

From the above description, the hydroxyamines, also known as alkanol amines, include primary, secondary or tertiary alkanol amines or mixtures thereof. When both $R^5$ groups are hydrogen, the hydroxyamine is a primary alkanol amine of the formula

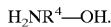

Preferably, the primary alkanol amine is monoethanolamine.

When one $R^5$ is hydrogen and the other $R^5$ is either an aliphatic group or hydroxy alkyl group, the hydroxyamine is a secondary alkanol amine of the formula

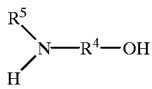

wherein the $R^5$ group is not hydrogen. When the one $R^5$ group is an aliphatic group, the aliphatic group preferably is an alkyl group comprising methyl, ethyl, propyl, butyl, pentyl or hexyl. Preferred $R^5$ alkyl groups are methyl and ethyl to give the preferred N-methyl-N-ethanolamine and N-ethyl-N-ethanolamine. When the one $R^5$ group is a hydroxy alkyl group, the alkyl group preferably contains from 1 to 6 carbon atoms. Most preferably, this hydroxy alkyl group is hydroxy methyl or hydroxy ethyl to give the preferred N-methanol-N-ethanolamine and diethanolamine.

When both $R^5$ groups are either independently an aliphatic group or a hydroxy alkyl group, the hydroxyamine is a tertiary alkanolamine of the formula

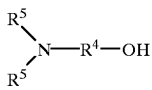

wherein the $R_5$ groups are not hydrogen. When both $R^5$ groups are aliphatic groups, the aliphatic groups preferably are alkyl groups comprising methyl, ethyl, propyl, butyl, pentyl or hexyl. Preferred $R^5$ alkyl groups are methyl and ethyl to give the preferred N,N-dimethylarninoethanol, N-methyl-N-ethylaminoethanol and N,N-diethylaminoethanol. When both $R^5$ groups are hydroxy alkyl groups, the alkyl group preferably contains from 1 to 6 carbon atoms. Most preferably, these hydroxy alkyl groups are hydroxy methyl or hydroxy ethyl to give the preferred N,N-dimethanolethanolamine, N-methanol-N-ethanolethanolamine and triethanolamine. When one $R^5$ group is aliphatic and the other $R^5$ group is hydroxy alkyl, the parameters of these $R^5$ groups are as defined above. Preferred mixed $R^5$ hydroxy amines are N-methyl-N-methanolethanolamine, N-methyl-N-ethanolethanolamine, N-ethyl-N-methanolethanolamine, N-ethyl-N-methanolethanolamine and N-ethyl-N-ethanolethanolamine.

The hydroxyimine having utility in this invention is a hydroxyimine of the structure

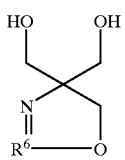
(III)

wherein $R^6$ is an aliphatic group containing from 5 up to 35 carbon atoms with the proviso that the hydroxyimines are not alkoxylated hydroxyimines. Hydroxyimines of structure III are prepared by reacting molar amounts of a fatty acid with tris(hydroxymethyl)aminoethane (THAM). The $R^6$ group is a residue of a fatty acid. An illustrative but non-exhaustive list of the fatty acids that can be reacted with THAM to form (III) which is an oxazoline are the mono-carboxylic acids of caproic acid, heptanoic acid, caprylic acid, nonanoic acid, capric acid, lauric acid, myristic acid, palmitic acid, stearic acid, oleic acid, linoleic acid and linolenic acid. A preferred oxazoline useful as structure (III) is available from Angus Chemical Company, Northbrook, Ill., as Alkaterge T which is prepared by reacting one mole of THAM with one mole of a tall oil fatty acid to give a product with a 60 percent oxazoline content of the structure

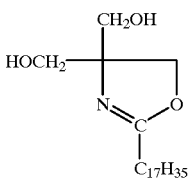

In order to form a rheology control agent (B) by utilizing the oxazoline as (ii), the oxazoline is reacted with a mixture of maleic anhydride and phthalic acid as (i). The mole ratio of oxazoline:maleic anhydride:phthalic acid is 2:3:1.

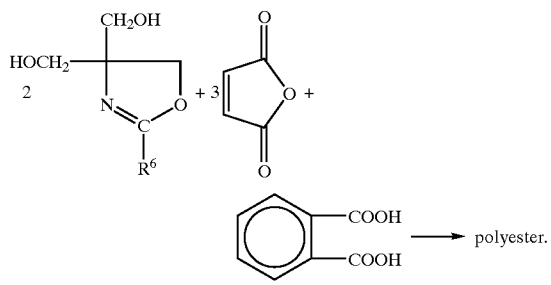

In forming the rheology control agent (B), the carboxylic acylating agent (i) and the hydroxyamine (ii) are reacted together at temperatures of from ambient up to the decomposition temperature of any reactant or product. The molar ratio of (i):(ii) is from 0.5–6:3, preferably from 1.5–4.5:3 and most preferably 1:1. When the molar ratio is 1:1, the rheology control agent (B) so formed is a polymeric product having ester, amide and salt functionalities.

Since the rheology control agent (B) is the reaction product of a carboxylic acylating agent (i) with a hydroxyamine or hydroxyimine (ii), one skilled in the art will readily appreciate the great variety of possible rheology control agents that can be formed from these reactants. The hydroxyamine reacts with the carboxylic acylating agent either as an amine or an alcohol. For example, the hydroxyamine may include primary, secondary or tertiary nitrogens. There are three basic types of reactions which a carboxylic acylating agent as a succinic acylating of formula I and II above can undergo with an amine. The first reaction is simple salt formation. In this reaction, the amine acts as a base and accepts a proton from the carboxylic acid. All ordinary amines can undergo this reaction. A typical equation for the formation of a salt from a hydroxyamine and a succinic acylating agent is as follows:

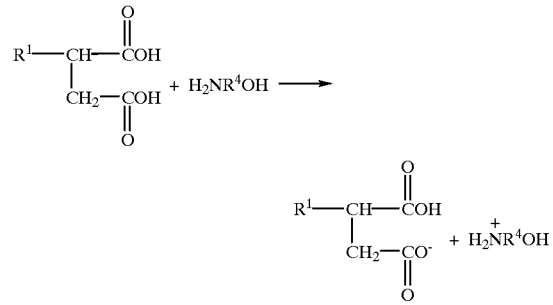

A second typical reaction which a hydroxyamine as an amine can undergo with a succinic acylating agent is the formation of an amide. In this reaction the hydroxyamine condenses with a single carboxyl group eliminating a molecular of water. Only primary and secondary hydroxyamines can undergo amide formation. A typical equation for the formation of an amide from a hydroxyamine and a substituted succinic acid is as follows:

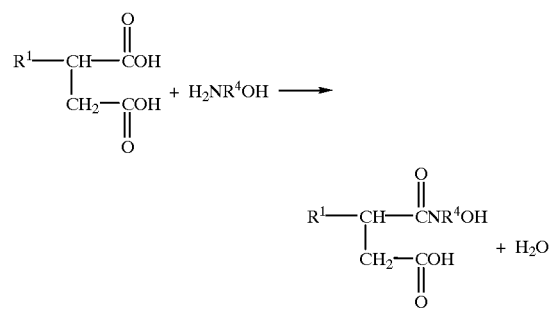

A typical equation for the formation of an amide from a hydroxyamine and a substituted succinic anhydride is

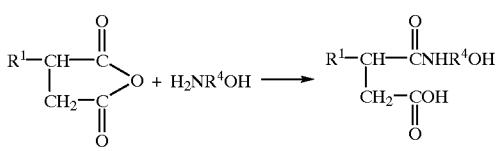

The third reaction of hydroxyamines as an amine with succinic acylating agents is imide formation. In this reaction an amine condenses with two carboxyl groups with the elimination of two molecules of water. Only primary hydroxyamines can undergo imide formation. Imides can be produced from either the succinic acid or the anhydride. However, when the anhydride is used, only one molecule of water is eliminated. A typical reaction for the formation of an imide from an amine and a substituted succinic anhydride is:

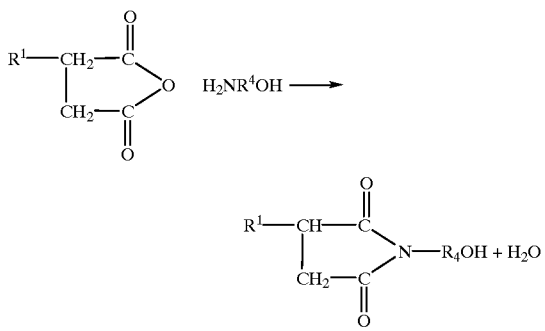

A typical equation for the formation of an imide from an amine and a substituted succinic acid is

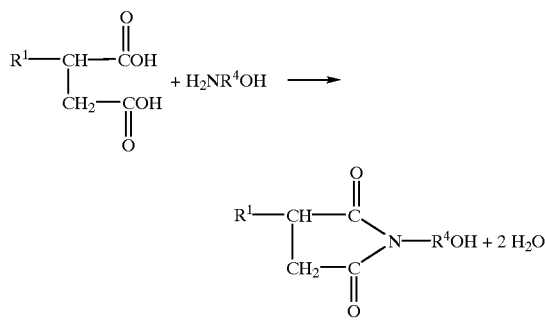

Salts form under relatively mild conditions, while the formation of amides and imides generally requires higher temperatures and longer reaction times.

The above reactions relate to how hydroxyamines react with succinic acylating agents when the hydroxyamine functions as an amine. The hydroxyamine can also function as an alcohol. The basic reaction between a hydroxyamine as an alcohol and a succinic acylating agent is ester formation. A typical equation for ester formation from an alcohol and a substituted succinic acid is

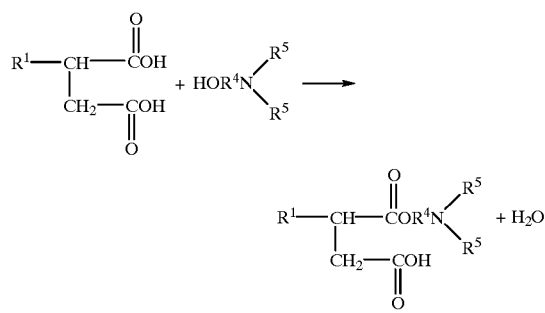

A typical equation for the formation of an ester from an alcohol and a substituted succinic anhydride is

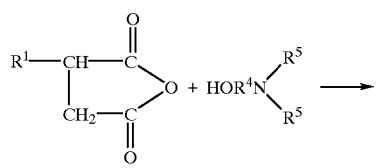

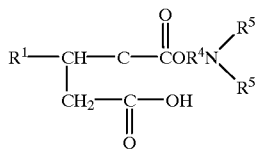

The following examples are illustrative of the preparation of the rheology control agent (B) of the present invention. Unless otherwise indicated, all parts and percentages are by weight.

EXAMPLE B-1

A reaction vessel equipped with a thermometer and a stirrer is charged with 133 parts (0.5 moles) of tetrapropylene-substituted succinic anhydride and 80.5 parts (0.5 moles) of the tertiary alkanolamine n-butyl diethanolamine. The reaction is exothermic to 80° C. The reaction mixture is heated to 110° C. and stirred for 0.5 hours. The contents are filtered using a diatomaceous earth filtering aid to give the desired product.

EXAMPLE B-2

A reaction vessel is charged with 166 parts (0.5 moles) of an isomerized $C_{16}$ alpha-olefin substituted succinic anhydride and 74.5 parts (0.5 moles) of the tertiary alkanolamine triethanolamine. The mixture is stirred at 110° C. for 0.5 hours and the contents are filtered using a filtering aid to give the desired product.

EXAMPLE B-3

Charged to a reaction vessel is 47 parts (0.11 moles) of a $C_{18-24}$ substituted succinic anhydride and 16 parts (0.207 moles) of the tertiary alkanolamine triethanolamine. After an initial exotherm, the mixture is slowly heated to 150° C. with nitrogen blowing at 0.25 cubic feet per hour. The contents are stirred for two hours. The liquid is the product having a total acid number (TAN) of 20.8 and a total base number (TBN) of 91.6.

EXAMPLE B-4

The procedure of Example B-3 is essentially repeated except that 127.4 parts (0.29 moles) of the substituted succinic anhydride of Example B-3 is used along with 30.4 parts (0.29 moles) of the secondary alkanolamine diethanolamine. The product has a percent nitrogen of 2.57, a TAN of 32.6 and a TBN of 28.

EXAMPLE B-5

Charged to a reaction vessel is 22.87 parts (0.036 moles) Alkaterge T and 23 parts methyl isoamyl ketone as a solvent. The contents are heated to 100° C. and added in one portion is a mixture of 5.2 parts (0.054 mole) maleic anhydride and 2.94 parts (0.177 mole) phthalic acid followed by 0.05 parts dibutyl tin dilaurate as a catalyst. The temperature is increased to 110° C. and held for 4 hours. The product contains 42.5 percent methyl isoamyl ketone as a diluent.

EXAMPLE B-6

Added to a reaction vessel are 172 parts (1.0 mole) capric acid and 61 parts (1.0 mole) of the primary alkanolamine monoethanolamine. The contents are heated to 150° C. and held for 3.0 hours. The liquid is the product.

EXAMPLE B-7

The procedure of Example B-6 is essentially followed except that the acylating agent (i) is 284 parts (1 mole) of stearic acid and the hydroxy amine (ii) is 75 parts (1 mole) of monopropanolamine.

EXAMPLE B-8

The procedure of Example B-6 is essentially followed except that the acylating agent (i) is 282 parts (1 mole) of oleic acid and the hydroxy amine (ii) is 61 parts (1 mole) of monoethanolamine.

EXAMPLE B-9

The procedure of Example B-6 is essentially followed except that the acylating agent (i) is 166 parts (1 mole) of phthalic acid and the hydroxy amine (ii) is 105 parts (1 mole) of diethanolamine.

EXAMPLE B-10

The procedure of Example B-6 is essentially followed except that the acylating agent (i) is 166 parts (1 mole) of phthalic acid and the hydroxyamine (ii) is 149 parts (1 mole) of triethanolamine.

EXAMPLE B-11

A reaction vessel is charged with 1000 parts (2.27 moles) of the substituted succinic anhydride of Example B-3 that has been preheated to not more than 90° C. Also charged is 1000 parts of an aromatic solvent. The contents are stirred and heated and 239 parts (2.27 moles) of diethanolamine are added in 30 minutes. The temperature is maintained at 146–152° C. until the direct acid number falls below 20. The contents are filtered to give a product having a 45% aromatic solvent diluent and a nitrogen value of 1.43 percent.

(C) The Pigment

The composition of this invention also includes (C) a pigment or pigments. The pigments provide opacity, color, and in some cases improvement in the corrosion resistance of the resulting coating. Further, there is an interaction between the pigments and the rheology control agent (B). While not wishing to be bound by theory, it is postulated that this interaction between components (B) and (C) causes an improvement in the sag control of the coating composition.

Pigments having utility in this invention comprise barium metaborate, calcium silicate, calcium borosilicate, calcium phosphosilicate, calcium molybdate, calcium strontium phosphosilicate, titanium dioxide, carbon black, phthalocyanine blue, zinc oxide, zinc molybdate, zinc phosphate or zinc hydroxyphosphite. An especially preferred pigment is titanium dioxide.

The composition of the present invention comprising components (A), (B) and (C) are useful as coating compositions.

The various components of this invention may, and quite often, contain solvents. These solvents are the type that are volatile such as methyl isoamyl ketone, methyl ethyl ketone and aromatic solvents. These solvents facilitate the preparation of the various components as well as the mixing of components with other components. Once the coating composition is prepared and applied to a workpiece, the solvents either evaporate off at room temperature or evaporate off when the workpieces are baked. Since solvents do not become an integral part of the final coating composition, the solvents in the components are labeled as an "inactive" ingredient. Everything else in the components is labeled as "active" ingredients. The Cargill 57 polyester resin that is used in Table I below has a percent actives of 85. This implies that the inactives are 15 percent As a formulated coating composition within the present invention, when the composition comprises components (A), (B) and (C), the following states ihe amounts of components used in parts by weight on an active basis:

| Component | Generally | Preferred | Most Preferred |
|---|---|---|---|
| (A) | 20–35 | 25–35 | 30–35 |
| (B) | 0.25–4 | 0.25–2 | 0.25–1 |
| (C) | 60–80 | 60–75 | 65–70 |

It is understood that other components besides (A), (B) and (C) may be present within the composition of this invention. Especially preferred additional components include slip and mar resistant aids such as BYK-300 which is a polyether modified dimethyl polysiloxane copolymer; crosslinking agents such as Resimene 747 or Cymel 303, surface active agents that promote flow and leveling, catalysts that promote cure such as BYK45 1 and various solvents such as n-butanol, methyl ethyl ketone, and methyl isoamyl ketone.

In order to prepare a coating composition the components of this invention are blended together to effect a homogeneous mixture. A portion of the film forming resin (A) is mixed with the pigment (C) and solvent in what is known as the "grind" phase. The purpose of the grind phase is to create a pigment concentrate and also to disperse the pigment in the resin, i.e., to provide pigment contact with the resin. After completion of the grind phase, the pigment concentrate is then added to a vessel that contains additional film forming resin as well as the crosslinking agents, surface active agents and various solvents in what is known as the "letdown" phase. It is during the letdown phase that the complete coating composition is prepared. The rheology control agent (B) can be added at the grind phase or at the letdown phase.

The following tables outline examples in parts by weight so as to provide those of ordinary skill in the art with a complete disclosure and description on how to make the composition of this invention and it is not intended to limit the scope of what the inventors regard as their invention.

The coating compositions as prepared in Tables I and II are evaluated in the Baker Sag Test which is a simple anti-sag test In the Baker Sag, an "A" rating is very good and signifies no sag. A "D" rating is very poor and signifies a great deal of sag.

TABLE I

| | Example 1 | Example 2 | Example 3 | Example 4 |
|---|---|---|---|---|
| Grind Phase | | | | |
| (A) Polyester resin[1] | 16.6 | 16.5 | 16.5 | 16.5 |
| (B) None Present | Control | | | |
| Thixatrol 289[2] | | 0.5 | | |
| Product of Ex (B-11) | | | 0.5 | |
| Product of Ex (B-5) | | | | 0.5 |
| (C) $TiO_2$[8] | 36.2 | 35.9 | 35.9 | 35.9 |
| Byk-Chemie-300 | 0.1 | 0.1 | 0.1 | 0.1 |
| Letdown Phase | | | | |
| (A) Polyester resin[1] | 23.3 | 23.1 | 23.1 | 23.1 |
| Crosslinking agent[3] | 11.3 | 11.2 | 11.2 | 11.2 |

TABLE I-continued

|  | Example 1 | Example 2 | Example 3 | Example 4 |
|---|---|---|---|---|
| Byk-Chemie-451 | 0.9 | 0.9 | 0.9 | 0.9 |
| MIAK[4] | 11.7 | 11.9 | 11.9 | 11.9 |
| Average Film. Thickness (mils) | 1.77 | 1.77 | 1.73 | 1.83 |
| Baker Sag[5] | D | A | A | A |
| 120° F. Oven Stability | Soft Settling | No Settling | No Settling | Medium Settling |

[1] Cargil 57-5776 from McWhorter
[2] Commercial product from Rheox, Inc. which is the reaction of a polycarboxylic acid and an alkoxylated amine
[3] Resimene 747 from Cytec
[4] Methyl isoamyl ketone
[5] A test developed by Baker Castor Oil Co.
[8] R-900 from DuPont

TABLE II

|  | Example 5 | Example 6 | Example 7 |
|---|---|---|---|
| Grind Phase |  |  |  |
| (A) Acrylic resin[6] | 222.4 | 222.4 | 222.4 |
| (B) None | Control |  |  |
| Thixatrol 289 |  | 5.98 |  |
| Product of Ex (B-11) |  |  | 5.44 |
| (C) TiO$_2$[8] | 346.6 | 346.6 | 346.6 |
| n-Butanol | 15.20 | 15.20 | 15.20 |
| Letdown Phase |  |  |  |
| (A) Acrylic resin[6] | 148.2 | 148.2 | 148.2 |
| Crosslinking agent | 127.0 | 127.0 | 127.0 |
| n-Butanol | 105.4 | 105.4 | 105.4 |
| Surface active agent | 0.4 | 0.4 | 0.4 |
| Byk-Chemie-451 | 10.6 | 10.6 | 10.6 |
| MEK[7] | 22.2 | 22.2 | 22.2 |
| Avg. Film Thickness (mils) | 1.69 | 1.87 | 1.70 |
| Baker Sag | D | A | A |

[6] Joncryl 500
[7] Methyl ethyl ketone
[8] R-900 from DuPont

What is claimed is:

1. A coating composition comprising
   (A) a film forming resin comprising polyester-melamine, polyester-urea/formaldehyde, alkyd-melamine alkyd-urea/formaldehyde, acrylic-melamine, acrylic-urea/formaldehyde, epoxy resins, epoxyester-melamine, polyurethane resins, acrylic resins, oleoresins, unsaturated polyesters, polyvinyl acetates, polyvinyl chlorides or vinylacrylics;
   (B) a rheology control comprising the reaction product of
      (i) at least one carboxylic acid acylating agent, and
      (ii) at least one nitrogen-containing compound consisting of a hydroxyamine or a hydroxyamine, with the provisio that the hydroxyamine and the hydroxyimine are not alkoxylated hydroxyamines and alkoxylated hydroxyimines wherein the hydroxyamines are represented by the formula

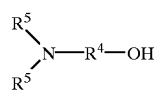

wherein $R^4$ is a divalent hydrocarbyl group containing from 2 up to 18 carbon atoms and each $R^5$ is independently hydrogen, an aliphatic group comprising methyl, ethyl, propyl or butyl or a hydroxy alkyl group containing from 1 to 5 carbon atoms; and (C) a pigment.

2. The composition of claim 1 wherein the film forming resin (A) comprises polyester-melamine, polyester-urea/formaldehyde, alkyd-melamine, acrylic melamine or polyurethanes.

3. The composition of claim 2 wherein the film forming resin (A) comprises polyester-melamine, acrylic-melamine or polyurethanes.

4. The composition of claim 1 wherein the carboxylic acid acylating agent comprises mono-carboxylic acid acylating agents, poly-carboxylic acid acylating agents, or mixtures thereof.

5. The composition of claim 4 wherein the mono-carboxylic acid acylating agents are of the formula $R^7COOH$ wherein $R^7$ is an aliphatic group wherein the aliphatic group is an alkyl group or alkenyl group and contains from 7 up to 23 carbon atoms.

6. The composition of claim 5 wherein the alkyl group or alkenyl group contains from 13 up to 19 carbon atoms.

7. The composition of claim 4 wherein the carboxylic acid acylating agent comprises poly-carboxylic acid acylating agents.

8. The composition of claim 7 wherein the poly-carboxylic acid acylating agents comprise dicarboxylic acid acylating agents or dicarboxylic acid anhydride acylating agents.

9. The composition of claim 8 wherein the dicarboxylic acid acylating agent and dicarboxylic acid anhydride acylating agent are of the formula

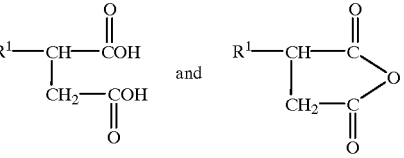

respectively wherein $R^1$ is a hydrocarbyl based substituent having from 5 up to 100 carbon atoms.

10. The composition of claim 9 wherein $R^1$ contains from 8 up to 50 carbon atoms.

11. The composition of claim 9 wherein $R^1$ contains from 18 up to 36 carbon atoms.

12. The composition of claim 8 wherein the dicarboxylic acid acylating agent and dicarboxylic acid anhydride acylating agent are of the formula

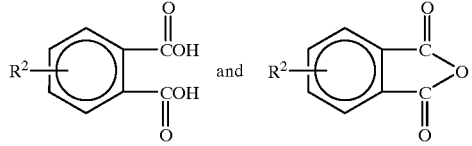

respectively wherein $R^2$ is hydrogen or an aliphatic group containing from 8 up to 36 carbon atoms.

13. The composition of claim 6 wherein the dicarboxylic acid acylating agent is of the formulae

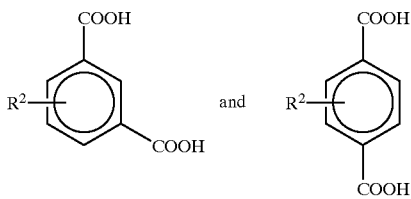

wherein $R^2$ is hydrogen or an aliphatic group containing from 8 up to 36 carbon atoms.

14. The composition of claim 4 wherein the polycarboxylic acylating agent comprises dimer acids, trimer acids or mixtures thereof.

15. The composition of claim 4 wherein the carboxylic acylating agent comprises a mixture of phthalic acid and maleic anhydride.

16. The composition of claim 1 wherein the $R^4$ group comprises ethylene, 1,2-propylene, 1,2-butylene, 1,3-butylene, 1,2-octylene, 1-2 decylene, 1,2-dodecylene, 1,2-hexadecylene or 1,2-octadecylene.

17. The composition of claim 1 wherein $R^4$ comprises an ethylene group.

18. The composition of claim 1 wherein the hydroxyamine is diethanolamine.

19. The composition of claim 1 wherein the hydroxyamine is triethanolamine.

20. The composition of claim 1 wherein the hydroxyimine is of the formula

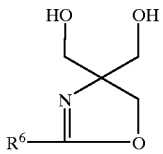

wherein $R^6$ is an aliphatic group containing from 7 up to 35 carbon atoms.

21. The composition of claim 20 wherein $R^6$ contains from 11 up to 23 carbon atoms.

22. The composition of claim 1 wherein the pigment (C) comprises barium metaborate, calcium silicate, calcium borosilicate, calcium phosphosilicate, calcium molybdate, calcium strontium phosphosilicate, titanium dioxide, carbon black, phthalocyanine blue, zinc oxide, zinc molybdate, zinc phosphate or zinc hydroxyphosphite.

23. A coating composition comprising (A) a polyester-melamine film forming resin, (B) a rheology control agent comprising the reaction product of an hydrocarbyl substituted succinic anhydride wherein the hydrocarbyl group contains from 18 to 24 carbon atoms with diethanolamine, and (C) a titanium dioxide pigment.

24. A coating composition comprising (A) a polyester-melamine film forming resin, (B) a rheology control agent comprising the reaction product of a mixture of phthalic acid and maleic anhydride with a hydroxyamine of the formula

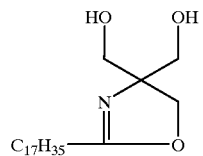

(C) a titanium dioxide pigment.

* * * * *